United States Patent
Jurca

[11] Patent Number: 6,118,527
[45] Date of Patent: Sep. 12, 2000

[54] METHOD FOR MONITORING THE FUNCTIONALITY OF THE TRANSPARENT PROTECTIVE ELEMENT OF A TRANSPARENT LASER OPTICAL SYSTEM, AND A DEVICE FOR CARRYING OUT THIS METHOD

[75] Inventor: Marius Jurca, Alzenau, Germany

[73] Assignee: Jurca Optoelektronik GmbH, Germany

[21] Appl. No.: 09/389,652

[22] Filed: Sep. 2, 1999

[30] Foreign Application Priority Data

Feb. 9, 1998 [DE] Germany ............................ 198 39 390

[51] Int. Cl.[7] .................................................. G01N 21/00
[52] U.S. Cl. ..................... 356/239.1; 356/239.2; 219/121.6
[58] Field of Search ............................ 356/239.1, 239.2; 219/121.6, 121.61, 121.76; 385/31, 32

[56] References Cited

U.S. PATENT DOCUMENTS 3,571,554  3/1971  Baujoin ................................. 219/121
5,430,816  7/1995  Furuya et al. ........................... 385/33
5,486,677  1/1996  Maischner et al. ................. 219/121.83
5,902,499  5/1999  Richerzhagen ..................... 219/121.84

*Primary Examiner*—Frank G. Font
*Assistant Examiner*—Layla G. Lauchman

[57] ABSTRACT

A type of "light barrier" is used to monitor the functionality of the transparent protective element (5) of a transparent laser optical system: additional light (15) is coupled into a lateral surface of the protective element (5) at an angle which deviates from the incidence direction of the laser beam (1, 2). Said light traverses the material of the protective element (5) and then exits again via the lateral surface, where it is detected by a light detector (16). Cracks and fractures of the protective element (5) can be detected by a change in the light received in the light detector (16). If appropriate, this measurement is supplemented by the measurement of the temperature difference between inflowing and outflowing cooling water, as well as by radiation temperature sensors (14) which monitor the local temperature distribution in the protective element (5).

21 Claims, 3 Drawing Sheets

METHOD FOR MONITORING THE FUNCTIONALITY OF THE TRANSPARENT PROTECTIVE ELEMENT OF A TRANSPARENT LASER OPTICAL SYSTEM, AND A DEVICE FOR CARRYING OUT THIS METHOD

The invention relates to a method for monitoring the functionality of the transparent protective element of a transparent laser optical system during the machining of a workpiece with a laser beam, in which light is detected which exits from the protective element at an angle which deviates from the direction of incidence of the laser beam, and to a device for carrying out this method with the aid of at least one light detector which is coupled onto a lateral surface of the protective element and detects light exiting from this lateral surface.

"Machining" with a laser beam is understood here to be any process in which a workpiece is acted upon in a way in which material is removed from this workpiece or from its environment, or there is at least the possibility of this. In particular, the production of a melting bath during welding or remelting of workpieces is intended hereby.

The last element in the beam guidance of an apparatus in which such laser machining takes place is particularly endangered by the proximity to the workpiece, in particular, as the case may be, to the melting bath, and by the influence of further environmental factors. Thus, welding splashes (liquid metal drops) which are hurled out of the melting bath are burnt into this last element, and this reduces the laser power made available at the workpiece. Since some laser machining processes react very sensitively to a reduction in laser power, even relatively slight reductions in power, for example those of 10%, can have significant consequences for the machining process.

Since the burnt-in welding splashes absorb laser power, they are heated up together with the surrounding glass material. This leads to local geometric deformations of the last element of the beam guidance, which, for their part, cause deformations of the wavefront, and thus changes in the laser power and/or laser intensity distribution which depend on the irradiation time.

As the most serious consequence of burnt-in splashes, it is possible for cracks to be produced in the last optical element of the laser optical system, or this element can be destroyed wholly or partially.

A further fault which can occur on the last transparent element of the laser optical system is, for example, a beam maladjustment, resulting in defective irradiation of the holder of this optical element, which produces shading of the workpiece and reduces the transmitted laser power. The holder of the last optical element also frequently contains base materials which are heated up in the event of defective laser beam positioning. A vapor and/or precipitate derived from the plastic can then be produced, which impairs the beam transmission. Further pollutants from the environment of the laser machining process can be spun by the protective gas normally employed, so that they are precipitated on the surface of the last optical element in the beam guidance and are burned on there by the high laser power. Here, as well, the consequence is increased absorption of the laser beam, and therefore a reduction in the laser power available at the workpiece.

The "last optical and/or last transparent element of the beam guidance and/or the laser optical system" addressed several times above can be the last focussing lens. However, for reasons of cost it is generally a protective glass disk which is used as the last optical and/or transparent element in this sense. The general term of "protective element" is employed below for the element in question.

DE 196 05 018 A1 discloses a method and a device of the type mentioned at the beginning with the aid of which the functionality of the protective element used, in this case a protective glass disk in concrete terms, is to be monitored. The known method is based exclusively on the mechanism that with increasing soiling of the protective glass by splashes or another dirt deposit laser light is increasingly coupled out through a lateral surface of the protective glass, as a consequence of the scattering at the pollutants. The intensity of the laser light "branched off" in this way can be detected by a light detector arranged on the lateral surface of the protective glass. If the light thus coupled out and detected exceeds a specific threshold value, this is understood as a disturbance of the functionality of the protective glass, and an appropriate alarm signal is triggered.

In this known method and this known device, no account is taken of some of the typical mechanisms which have already been enumerated above and impair the welding quality. In particular in the case of crack formation or even destruction of the protective glass disk, no appropriate alarm is ensured, since such cracks need not necessarily lead to an increase in the laser light coupled out laterally. Even very strong local events which can lead to local temperature increases and precede destruction of the protective glass disk are generally not detected.

It is the object of the present invention to configure a method and a device of the type mentioned at the beginning such that, in particular, crack formations or instances of a destruction of the protective element can be reliably detected.

As regards the method, this object is achieved by virtue of the fact that at a direction deviating from the direction of incidence of the laser beam there is coupled into the protective element additional light which passes through the protective element and is detected at least as part of the exiting light after traversing the protective element.

The method according to the invention therefore makes use of a type of "light barrier principle": it is not (only) the laser light present in any case which is detected as a function of the scattering at the soiled surface of the protective element; rather, additional light is coupled into the lateral surface of the protective element. The change in intensity of this additionally coupled-in light upon passage through the protective element is monitored. This yields additional information on the mechanical state of the protective element. The complete absence of the protective element typically causes a change in amplitude of the detected light of 250–400%. By contrast, the cracks usually occurring cause a sudden change (mostly a reduction) in the measured light which exits.

It is advantageous if the intensity of the additional light is modulated. It is possible in this way to distinguish between the additionally entering light, which forms the light barrier, and scattered laser light which can be detected, likewise separately, in agreement with the above-named DE 196 05 018 A1.

It is advantageous if the local temperature distribution in the protective element is additionally detected. In a way of no interest here, conclusions on the location and the type of influence exerted on the protective element can be obtained from the type of local change in temperature in the protective element and from the speed at which this change occurs.

In addition, the difference between the temperature of cooling water flowing to the holder of the protective element and cooling water returning therefrom can expediently be determined. This temperature difference can be used to obtain information on an incipient soiling of the protective element surface, which information leads rather to a "global" change in temperature of the protective element, and thus also of the cooling water used to cool it.

In the case of the subject matter of the abovementioned DE 196 05 018 A1, the instantaneous laser power must be known at any time in order to standardize the measuring effect. The precise location at which this laser power measurement is performed is not specified in this printed document. It is therefore to be assumed that the laser power is—as usual—measured there in the laser unit itself. Such a measurement is, however, not satisfactory, since possible sudden absorption losses in the beam guidance system (usually an optical fiber) remain undetected, and are compensated for in the known apparatus by the measured scattered radiation in the case of burnt-in splashes. The known device can, moreover, not take account of new, different protective elements in the event of a change of protective element after breakage of the protective element.

For this reason, particular preference is given to an embodiment of the method according to the invention in which after each intentionally caused change in the system a measurement of the various parameters is performed and the measurement results are stored as reference value for the continuous monitoring. "Each intentionally caused change" is understood as each change in the case of which the parameters measured by the various sensors can change without there actually being an impairment of the protective element. The use of another protective element, a change in the laser power or a change in the laser beam guidance system may be named here as examples. In the "initialization step" outlined in the method according to the invention, after each such intentionally caused change in the system there are obtained in conjunction with a demonstrably functional protective element reference values in comparison with which changes are determined in the later monitoring operation. If these changes exceed specific threshold values, this is understood as operationally conditioned, undesired impairment of the protective element.

As regards the device, the object outlined above is achieved by virtue of the fact that, in addition, at least one light source is coupled onto the lateral surface of the protective element in such a way that it cooperates with the light detector in the manner of a light barrier.

The advantages of a device according to the invention concur in terms of their meaning with the abovementioned advantages of the method according to the invention.

At least two light sources are expediently provided and arranged such that the principal axes of the light emitted by them are approximately perpendicular to one another. The reliability of detection is thereby increased. Specifically, there is then a reduction in the probability that cracks are not detected because they run parallel to the direction of the light.

Each light source should preferably be operated by means of alternating current. It has already been pointed out above that it is possible in this way to distinguish electronically between the additional light employed in the light barrier and laser light which exits via the lateral surface of the protective element in accordance with the known effect. When the alternating current has an at least approximately sinusoidal shape, the EMC emission is minimal.

In a preferred exemplary embodiment of the device according to the invention, connected upstream of each light detector is a filter which is transparent to the wavelength of the laser beam and to the wavelength of the light source, but not to the ambient light. The screening of the light detectors against ambient light avoids a "saturation" of the light detectors which is otherwise caused by this. Because of the transparency to the wavelength of the laser beam and to the wavelength of the additional light source, each detector can carry out two functions: that which has already been addressed in DE 196 05 018 A1, and that according to the invention as part of a "light barrier".

The information supplied by the device according to the invention is even more informative when at least one radiation temperature sensor is provided which monitors the temperature of the protective element. It is even better when a plurality of radiation temperature sensors are provided which monitor the local temperature in different regions of the protective element. It is also possible for some of the plurality of radiation temperature sensors to react quickly, and for others to react slowly to changes in temperature. The more information that is obtained in this way on the distribution of the temperature in the protective element and on the speed of the build-up of this temperature, the better the knowledge that can be obtained on the type of the impairments of the protective element and any possible changes impending.

Even in the case of that device in which the protective element is arranged in a holder which has a duct for cooling water and in which two contact temperature sensors are provided of which one measures the temperature of the inflowing cooling water, and the other measures the temperature of the outflowing cooling water, information which can additionally be used is obtained on the state of the protective element.

Particularly preferred is that refinement of the device which has a memory in which the values determined by the various sensors can be stored in an initialization mode after each intentionally caused change in the system, and are available there as comparative value for the subsequent monitoring. The purpose of this "self-learning" refinement of the device has been already considered above when discussing the method according to the invention.

Each light source is expediently a light-emitting diode, and each light detector is expediently a photodiode. These optoelectronic elements are cost-effective and so small that they can easily be integrated. Consequently, it is possible in most instances for each light source and/or each light detector to be arranged directly neighboring the lateral surface of the protective element.

Should it exceptionally be impossible, for geometrical reasons, to bring the light source and/or photodiodes directly up to the lateral surface of the protective element, that refinement of the device according to the invention is suggested in which each light source and/or each light detector is coupled onto the lateral surface of the protective element via an optical conductor. In this case, the light source and/or light detector can be mounted at virtually any spacing from the protective element at a point where sufficient space for this is available.

An exemplary embodiment of the invention is explained in more detail below with the aid of the drawing, in which.

Figure 1:
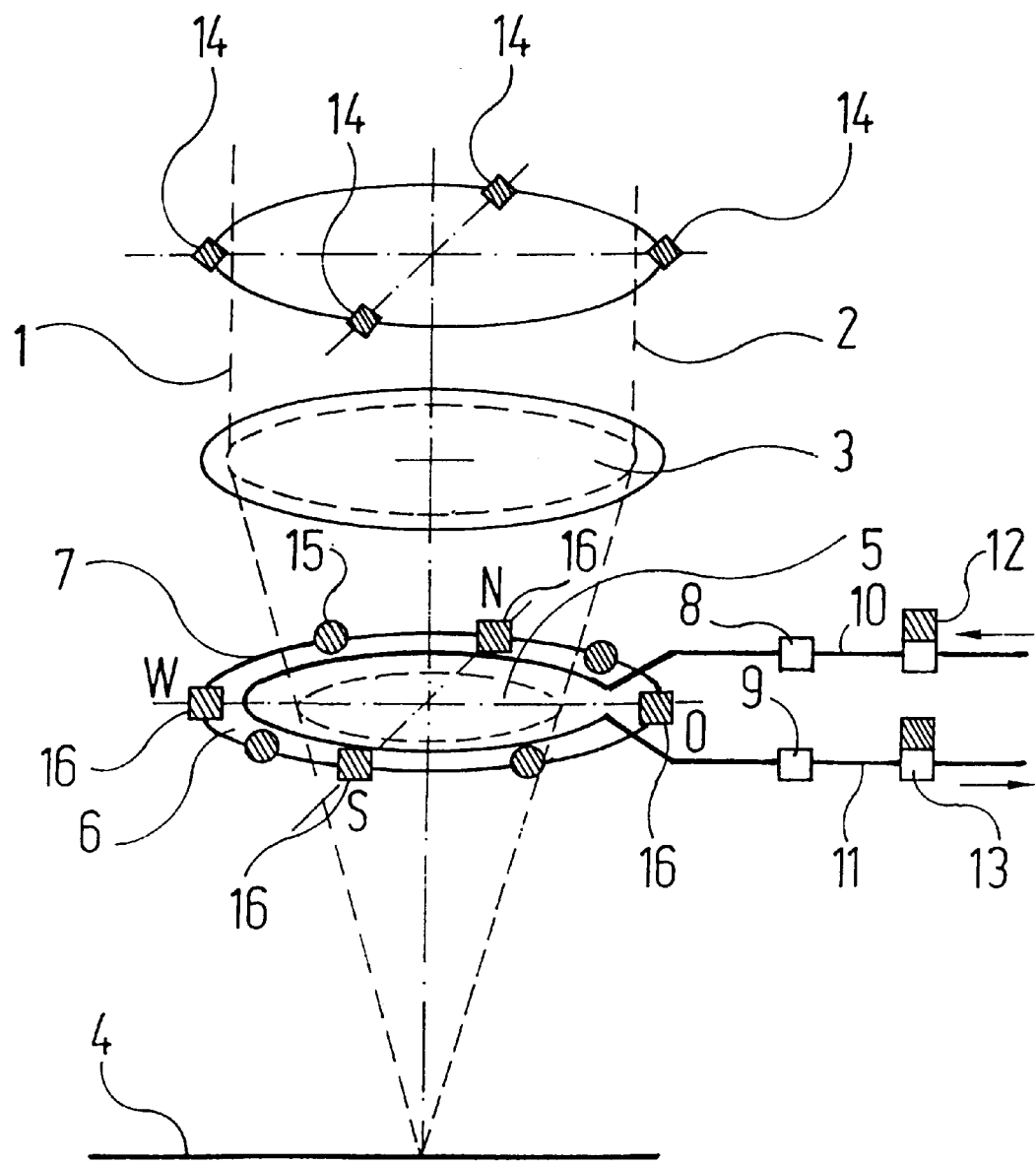
FIG. 1 shows a diagram of the arrangement of the various sensors on a protective glass disk holder.

The reference numerals 1 and 2 in FIG. 1 mark the edge beams of a laser beam which originates from a laser light source which is not represented. The laser beam 1, 2 is focused onto a workpiece by a laser welding optical system 3 which is represented in FIG. 1 as a simple lens. Arranged between the lens 3 and the workpiece 4 as last transparent element of the beam guidance is a protective glass disk 5 which serves the purpose of protecting from damage the components of the beam guidance which are situated further "inward", thus the lens 3, for example.

The protective glass disk 5 is supported by an annular holder 6 which is represented only diagrammatically in FIG. 1, and whose precise design is described further below with the aid of FIGS. 3 and 4. The holder 6 has a loop-shaped duct 7 through which cooling water flows. The cooling water is fed to the duct 7 via an inlet 8 and removed via an outlet 9. At least the region of the holder 6 between the inlet 8 and outlet 9 is produced from a material which is a poor conductor of heat, so that no thermal bridge exists here. Connected to the inlet 8 and outlet 9 are plastic cooling water hoses 10 and 11, respectively, in which a contact temperature sensor 12, 13 respectively detects the temperature of the cooling water flowing through.

Located above the lens 3 in the exemplary body represented are four radiation temperature sensors 14 which in each case "see" specific regions of the protective glass 5, that is to say which detect the thermal radiation emanating from these regions. On the other hand, this alignment is such that no thermal radiation emanating from the melting bath or the welding bead on the workpiece 4, and also no laser light reflected at the lens 3 strikes the radiation temperature sensors. Two of these radiation temperature sensors 14 are designed for quick measurements (for example as pyrometers), and thus detect quick changes in temperature in the region of the protective glass disk 5 monitored by them. Two of these radiation temperature sensors 14, by contrast, operate relatively "slowly", and thus detect those changes in temperature which are set up over lengthy time intervals.

Arranged on the holder 6 of the protective glass 5 are the following optoelectronic elements, which all serve in a way described further below to monitor the functionality of the protective glass 5:

Four light-emitting diodes 15 are mounted at a spacing of 90° in each case around the circumference of the edge of the holder 6, which surrounds the end face, which is in the shape of the outer surface of a cylinder, of the protective glass 5. In the same edge surface of the holder 6, four photodiodes 16 are arranged, likewise at a spacing of 90° in each case, but displaced by 45° with respect to the light-emitting diodes 15.

During continuous monitoring operation, two of the light-emitting diodes 15 which are adjacent to one another and whose optical axes are mutually perpendicular, are used in the manner of an active light barrier, the photodetectors 16, which are respectively opposite one another and are situated inside the light beams emitted by the light-emitting diodes 15, serving as receivers.

Figure 2:
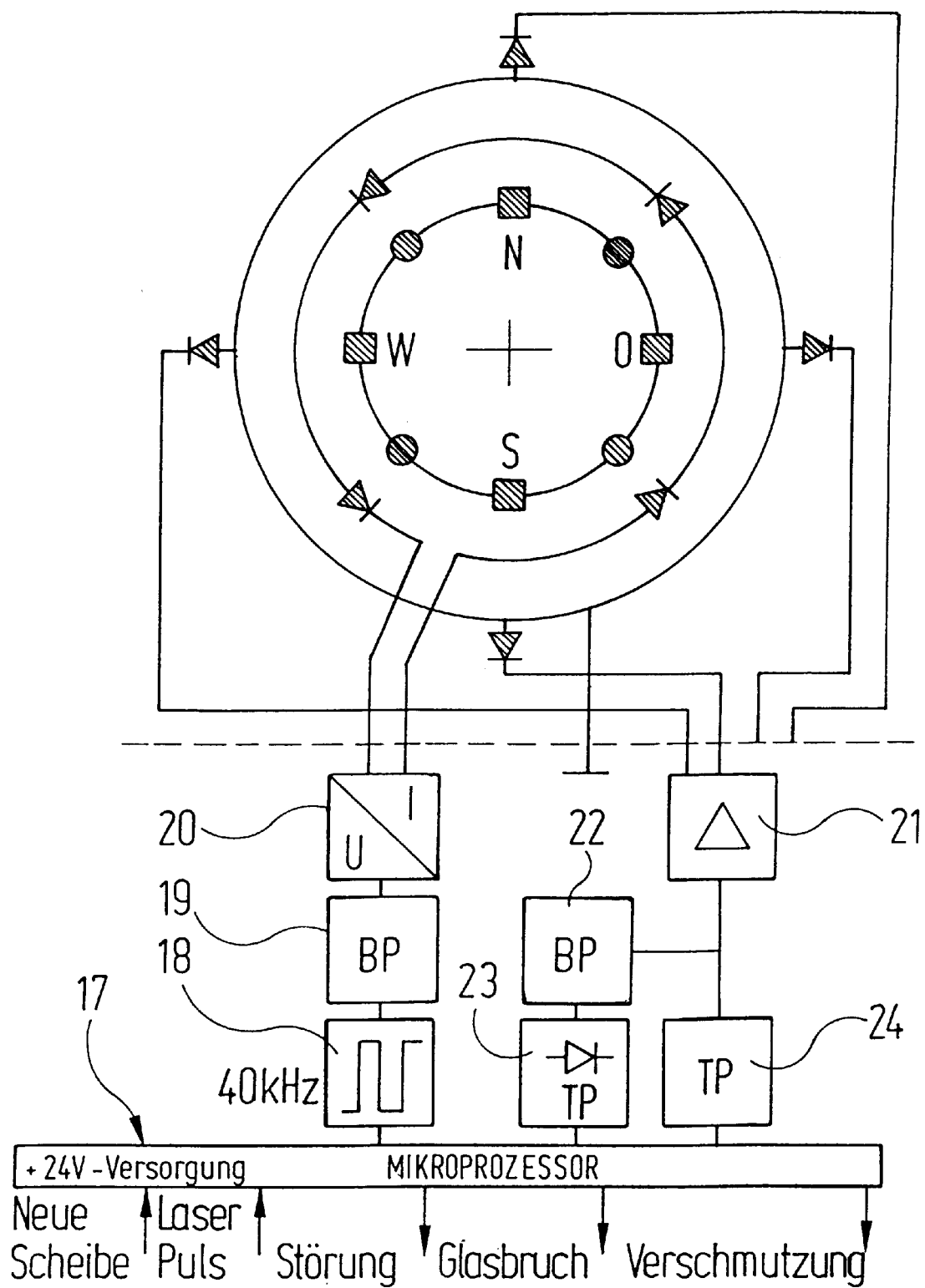
FIG. 2 shows a diagram of the circuit arrangement for operating the various sensors in FIG. 1.

The circuit arrangement with the aid of which the various optoelectronic elements 15, 16 are operated is represented in more detail in FIG. 2.

The central element of this circuit arrangement is a microprocessor 17 which in the exemplary embodiment represented drives a square-wave generator operating at 40 kHz. The output signal of the square-wave generator 18 is led through a bandpass filter 19 which is tuned to the fundamental frequency of the square-wave generator 18, thus to 40 kHz, in the present case, and the higher harmonics are removed from this signal in such a way that the output signal of the bandpass filter 19 is essentially a pure sinusoidal signal. This signal is then fed to a constant current source 20 which provides the (likewise sinusoidal) operating current for the light-emitting diodes 15. All the light-emitting diodes 15 are connected in series, as FIG. 2 makes clear.

The various photodiodes 16 in the holder 6 are connected in parallel in such a way that they have a common frame connection. The output signals of the four photodiodes 16 are processed in each case in separate circuit branches, of which only one is represented in FIG. 2: after traversing a preamplifier 21, the signal is split: on the one hand, it is fed via a bandpass filter 22, tuned to the measuring frequency (40 kHz in the present case)and a low-pass filter 22 to the microprocessor 17; this signal component serves to verify the signals which are caused by the light-emitting diodes 15. On the other hand, the output signal of the preamplifier 21 is fed directly to a low-pass filter whose output signal is likewise fed to the microprocessor 17 and is representative of signals which stem from scattering of the laser light from the protective glass disk 5.

Connected in each case upstream of the photodiodes 16 is a filter which is transparent both to the wavelength of the laser beam and to the wavelength of the light-emitting diodes 15 used, but, in contrast, not to daylight.

The microprocessor 17 has an input "new disk", a further input "laser pulse" and the outputs "interference", "glass breakage", "soiling", whose significance will now be examined in more detail when describing the mode of operation of the device.

If the device is being commissioned, or a new protective glass disk 5 is being inserted, the electronic system, which is represented in FIG. 2, firstly goes into an "initialization mode", which is set in train by actuating the input "new disk". In this initialization mode, there are stored in the microprocessor 17 or a memory driven by this microprocessor, those operating data of the various sensors 12, 13, 14, 15, 16 which result for the respective laser machining operation when the protective glass disk 5 is intact. These "self-learned" memory values then serve as reference during the later monitoring, so that deviations from the stored values can be detected as malfunctioning.

If, now, welding splashes for example, are hurled from the melting bath during the laser machining and reach the protective glass disk 5, or if other pollutants are precipitated on the protective glass surface from the environment of the welding process, the result is an increased absorption of laser power at the protective glass 5 and a corresponding reduction in the available laser power in the workpiece 4. This increase in the absorption can be detected in the simplest case with the aid of the contact temperature sensors 12 and 13: specifically, in this case there is an increase in the temperature difference between the inflowing cooling water, which is measured by the contact temperature sensor 12, and outflowing cooling water, which is monitored by the contact temperature sensor 13. The higher the temperature difference, the higher the absorption of laser power which takes place at the protective glass 5. The effect is similar when the holder 6 itself is irradiated as a consequence of beam maladjustment, something which could lead to shading of the workpiece 4.

Relatively large welding splashes which reach the protective glass 5 can be detected by virtue of the fact that the laser light which is increasingly coupled out inside the protective glass 5 and exits via the end face of the protective glass 5 is detected by the photodiodes 16. This is the effect which is also made use of by DE 196 05 018 A1 already mentioned above.

Such relatively large welding splashes can also very strongly increase the local temperature of the protective glass 5 during the welding process, and this cannot be detected straight away with the aid of the means described so far. Such local increases in temperature can lead to geometrical deformations of the protective glass disk, and thus to the deformations of the wavefront already mentioned. These local increases in temperature can be detected with the aid of the radiation temperature sensors 14. Additional information on the type of soiling can be obtained on the basis of the distinction between "slow" and "quick" local changes in temperature which can be differentiated on the basis of the different design of the radiation temperature sensors 14 used. This information can be evaluated using a specific logic, which is of no interest in the present connection.

If burnt-in splashes cause the formation of cracks or even the destruction of the protective glass 5, this is detected by the light barriers, which are formed, on the one hand, by the light-emitting diodes and, on the other hand, by the photodiodes 16 irradiated by them. Since the light-emitting diodes 15 are operated using alternating current, it is possible to use the circuit arrangement represented in FIG. 2, despite the use of the same photodiodes 16 as detectors, to distinguish which signal components stem from the scattered laser light and which signal components stem from the light-emitting diodes 15. Since the light-emitting diodes are, however, driven with a sinusoidal alternating current, the EMC emission and the possible interference, thereby induced, in the output signals of the photodiodes 16 are reduced to a minimum.

If a rise, exceeding a specific measure, is detected in the temperature difference between the inflowing and the outflowing mixed water with the aid of the contact temperature sensors 12 and 13 in the cooling water hoses 10, 11, or if the radiation temperature sensors 14 detect strong local increases in temperature in the protective glass 5, or if an increased component of the coupled-out laser light is detected with the aid of the photodiodes 16, the microprocessor 17 activates the output "soiling". This output signal can be used to generate an optical and/or acoustic warning or, if appropriate, also to stop the welding process.

If the light barriers formed by the light-emitting diodes 15 and the respectively assigned photodiodes 16 detect cracks in the protective glass disk 5 or breakage thereof, the microprocessor 17 generates the output signal "glass breakage", which is likewise indicated in an appropriate acoustic or optical way and leads in each case to switching off the welding process.

The described monitoring device is synchronized with the operation of the laser welding apparatus by the input "laser pulse" since the monitoring device can, of course, remain inoperative as long as no welding is being performed. The input "laser pulse" can thus be fed any signal which is characteristic of the fact that the laser is in operation.

After being switched on, the electronic system represented in FIG. 2 also carries out a self-test routine in each case; if a fault is detected thereby, the microprocessor generates a fault signal at the output "interference".

Figure 3:
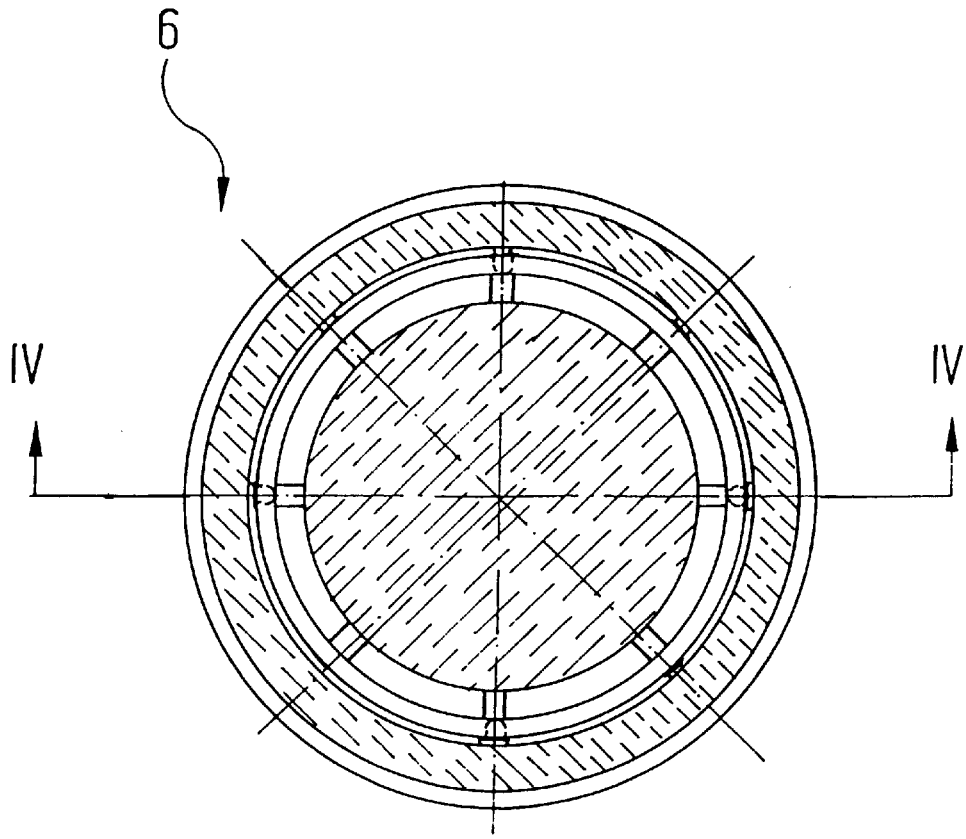
FIG. 3 shows the top view of a concrete exemplary embodiment of a protective glass holder with protective glass inserted.
Figure 4:
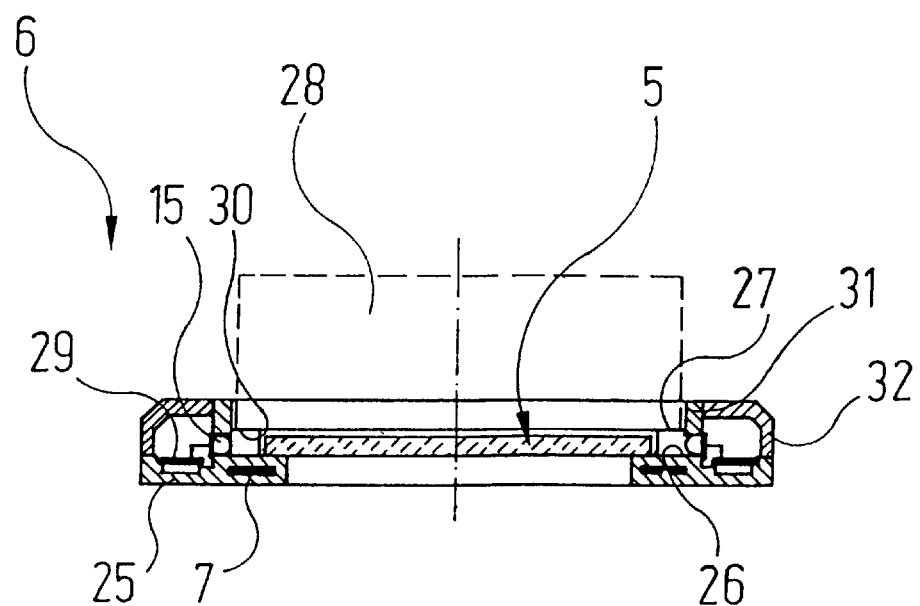
FIG. 4 shows a section in accordance with line IV—IV in FIG. 3.

The mechanical design of the holder 6 may be gathered from FIGS. 3 and 4. It comprises a holding ring 25 in whose radially inner region the cooling water duct 7 already mentioned above is incorporated. The protective glass 5 is mounted on a step 26 on the inner contour of the holding ring 25 without being stressed. Located immediately above the upper surface of the protective glass 5 in the holding ring 26 is an internal thread 27 which is screwed onto an external thread of the diagrammatically represented collimator 28 of the beam guidance system.

In the radially outer region, the holding ring 25 supports a printed circuit 29 which includes the electronic components and line connections required to operate the light-emitting diodes 15 and photodiodes 16, in particular also sockets into which the light-emitting diodes 15 and 16 can be plugged such that they are in "visible connection" with the end face, in the form of the outer surface of a cylinder, of the protective glass 5 through openings 30 in the holding ring 25. The openings 30 run as through-bores through a hollow cylindrical attachment 31 of the holding ring 25, into which the light-emitting diodes and photodiodes 15 and 16, respectively, are plugged, and as upwardly open cutouts in the region of the step 26 on which the protective glass 5 rests.

The space between the upper edge of the attachment 31 and the radially outermost edge of the holding ring 26, in which the printed circuit 25 is located, is covered by a lid 32 of the type of an angular ring.

The various electrooptical components essentially have considerable assembly and manufacturing tolerances. Thus, there are differences in sensitivity with the photodiodes, differences in light yield with the light-emitting diodes, and differences in the receiving and emitting angles with the photodiodes and light-emitting diodes, as well as mechanical manufacturing and alignment tolerances. In order to prevent different monitoring devices from differing too much from one another in their properties, and therefore no longer being interchangeable, a calibration is undertaken at the factory. The individual deviations determined for the individual electrooptical components can then be compensated computationally or by changing the drive or amplification. This is performed semiautomatically under the control of a microprocessor.

What is claimed is:

1. Method for monitoring the functionality of the transparent protective element of a transparent laser optical system during the machining of a workpiece with a laser beam, in which light is detected which exits from the protective element at an angle which deviates from the direction of incidence of the laser beam, characterized in that via a direction deviating from the incidence direction of the laser beam (1, 2) there is coupled into the protective element (5) additional light which passes through the protective element (5) and is detected at least as part of the exiting light after traversing the protective element (5).

2. Method according to claim 1, characterized in that the intensity of the additional light is modulated.

3. Method according to claim 1, characterized in that, in addition, the local temperature distribution in the protective element (5) is detected.

4. Method according to claim 1, that, in addition, the difference between the temperature of cooling water flowing to the holder (6) of the protective element (5) and cooling water returning therefrom is determined.

5. Method according to claim 1, characterized in that after each intentionally caused change in the system a measurement of the various parameters is performed and the measurement results are stored as reference value for the continuous monitoring.

6. Device for carrying out the method according to claim 1 with the aid of at least one light detector which is coupled onto a lateral surface of the protective element and detects light exiting from this lateral surface, characterized in that at least one additional light source (5) is coupled onto the lateral surface of the protective element (5) in such a way that it cooperates with the light detector (16) in the manner of a light barrier.

7. Device according to claim 6, characterized in that at least two light sources (15) are provided and arranged such that the principal axes of the light emitted by them are approximately perpendicular to one another.

8. Device according to claim 6, characterized in that each light source (15) is operated by means of alternating current.

9. Device according to claim 8, characterized in that the alternating current has at least approximately sinusoidal shape.

10. Device according to claim 6, characterized in that connected upstream of each light detector (16) is a filter which is transparent to the wavelength of the laser beam and to the wavelength of the light source (15), but not to the ambient light.

11. Device according to claim 6, characterized in that at least one radiation temperature sensor (14) is provided which monitors the temperature of the protective element (5).

12. Device according to claim 11, characterized in that a plurality of radiation temperature sensors (14) are provided which monitor the local temperature in different regions of the protective element (5).

13. Device according to claim 11, characterized in that a plurality of radiation temperature sensors (14) are provided of which some react quickly, and others react slowly to temperature changes.

14. Device according to claim 6, characterized in that the protective element (5) is arranged in a holder (6) which has a duct (7) for cooling water, and in that two contact temperature sensors (12, 13) are provided of which one (12) measures the temperature of the inflowing cooling water, and the other (13) measures the temperature of the outflowing cooling water.

15. Device according to claim 6, characterized in that it has a memory in which the values determined by the various sensors (12, 13, 14, 15, 16) can be stored in an initialization mode after each intentionally caused change in the system, and are available there as reference value for the subsequent monitoring.

16. Device according to claim 6, characterized in that each light source (15) is a light-emitting diode.

17. Device according to claim 6, characterized in that each light detector (16) is a photodiode.

18. Device according to claim 6, characterized in that each light source (15) is arranged directly neighboring the lateral surface of the protective element (5).

19. Device according to claim 6, characterized in that each light source is coupled onto the lateral surface of the protective element via an optical conductor.

20. Device according to claim 6, characterized in that each light detector (16) is arranged directly neighboring the lateral surface of the protective element (5).

21. Device according to claim 6, characterized in that each light detector is coupled onto the lateral surface of the protective element via an optical conductor.

* * * * *